UNITED STATES PATENT OFFICE.

FRITZ ULLMANN, OF BERLIN, GERMANY, ASSIGNOR TO ACTIEN GESELLSCHAFT FÜR ANILIN FABRIKATION, OF BERLIN, GERMANY.

ANTHRAQUINONE ACRIDONES.

961,047.  Specification of Letters Patent.  Patented June 7, 1910.

No Drawing.  Application filed February 23, 1910.  Serial No. 545,328.

*To all whom it may concern:*

Be it known that I, FRITZ ULLMANN, subject of the King of Bavaria, residing at Berlin, Germany, (my post-office address being Schwäbischestrasse 8, Berlin, W. 30,) have invented certain new and useful Improvements in New Dyestuffs of the Anthraquinone Series and Process of Making Same, of which the following is a specification.

My invention relates to new vat dyestuffs of the anthraquinone series, being so-called anthraquinone-acridones and the simplest dyestuff of this class having the formula:

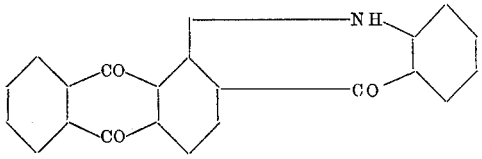

These new dyestuffs may be obtained by splitting off water from alpha-anilidoanthra-quinone-carboxylic acids of the general formula:

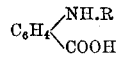

in which formula R represents an anthraquinone-residue or a substituted anthraquinone-residue, so that for instance a parent-material for my process is alpha-anilido-anthraquinone-carboxylic acid of the formula:

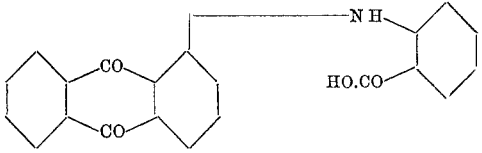

The elimination of water from the parent-materials may be effected by the action of a suitable dehydrating agent, for instance by warming the acids with concentrated sulfuric acid, or by transforming the respective carboxylic acid into the corresponding acid chlorid and treating these chlorids with aluminium-chlorid.

As to the parent-materials it may be stated that they can be obtained for instance by acting with alpha-chloranthraquinone or alpha-nitroanthraquinone upon anthranilic acid.

Example: 2.5 parts of alpha-anilido-anthraquinone-carboxylic acid (obtainable from alpha-nitro-anthraquinone or alpha-chloranthraquinone and anthranilic acid) are covered with 20-30 parts of benzene or another indifferent substance and are treated with 2.2 parts of phosphorous pentachlorid to convert them into the red anilido-anthraquinone-carboxylic acid chlorid. 3-5 parts of anhydrous aluminium chlorid are then added, whereupon the mixture becomes hot, much hydrogen chlorid is evolved and the mass becomes first brown and then green; after a short time the conversion is complete. The mixture is hereupon mixed with ice water, the benzene distilled away with steam and the anthraquinone-acridone that remains in the form of violet needles is filtered, washed and dried. When recrystallized from anilin, it forms violet needles of metallic luster, which are insoluble in alcohol and ether, but are easily soluble in boiling anilin to a violet solution. Concentrated sulfuric acid dissolves it to a red solution.

The dyestuff thus obtained forms by means of a salt of hydrosulfurous acid and an alkaline a blue vat from which cotton is dyed a very fast and clear bluish red tint.

It is obvious that my invention is not limited to the foregoing example or to the details given therein. For instance, instead of alpha-anilidoanthraquinone-carboxylic acid used in the above example the 1-anilido-4-methylanthraquinone carboxylic acid obtainable from 1-chloro-4-methylanthraquinone and anthranilic acid may be employed. The dyestuff thus obtained produces from the vat somewhat more bluish tints than the dyestuff of the above example.

Of course, in using the carboxylic acids directly for splitting off water instead of concentrated sulfuric acid named above any dehydrating agent suitable for my process may be employed.

What I claim is;

1. The hereinbefore-described new dyestuffs of the anthraquinone-series being anthraquinone-acridones, which new dyestuffs may be obtained by eliminating water from an alpha-anilidoanthraquinone-carboxylic acid of the general formula hereinbefore-defined, which new dyestuffs are insoluble in alcohol and ether, but easily soluble in boiling anilin to a violet solution, whereas sulfuric acid dissolves them to a red solution, which new dyestuffs form with a salt of hydrosulfurous acid and an alkali a vat from which cotton is dyed very fast red to violet tints.

2. As a new article of manufacture the hereinbefore-described new dyestuff of the anthraquinone series being alpha-beta-anthraquinonyl-acridone having the formula:

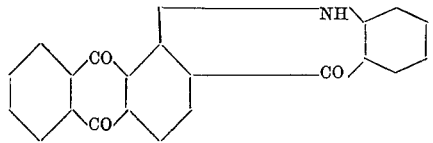

which new dyestuff when recrystallized from anilin forms violet needles of a metallic luster and is insoluble in alcohol and ether but is easily soluble in boiling anilin to a violet solution, whereas sulfuric acid dissolves it to a red solution, which new dyestuff forms with a salt of hydrosulfurous acid and an alkali a blue vat from which cotton is dyed a very fast bluish red tint.

In testimony whereof I have hereunto set my hand in presence of two subscribing witnesses.

FRITZ ULLMANN.

Witnesses:
    HENRY HASPER,
    WOLDEMAR HAUPT.